J. G. HIRZEL.
Meat Chopper.

No. 80,955.  Patented Aug. 11, 1868.

Witnesses:  Inventor:

United States Patent Office.

JOHN GEORGE HIRZEL, OF WILMINGTON, DELAWARE.

*Letters Patent No. 80,955, dated August 11, 1868.*

IMPROVED MEAT-CHOPPER.

*The Schedule referred to in these Letters Patent and making part of the same.*

Be it known that I, JOHN GEORGE HIRZEL, of the city of Wilmington, in the State of Delaware, have invented a new and useful machine for chopping meat, which I term a Rotary Meat-Chopper; and I do hereby declare that the following is a full, clear, and exact description of the construction and operation of the same, reference being had to the annexed drawings making a part of this specification, in which—

Figure 1:
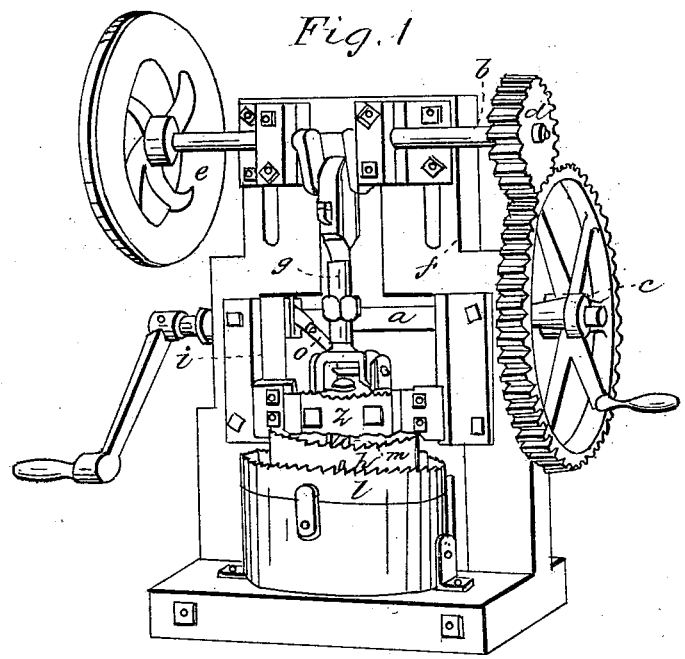
Figure 1 is a perspective view of the front of the machine.
Figure 2:
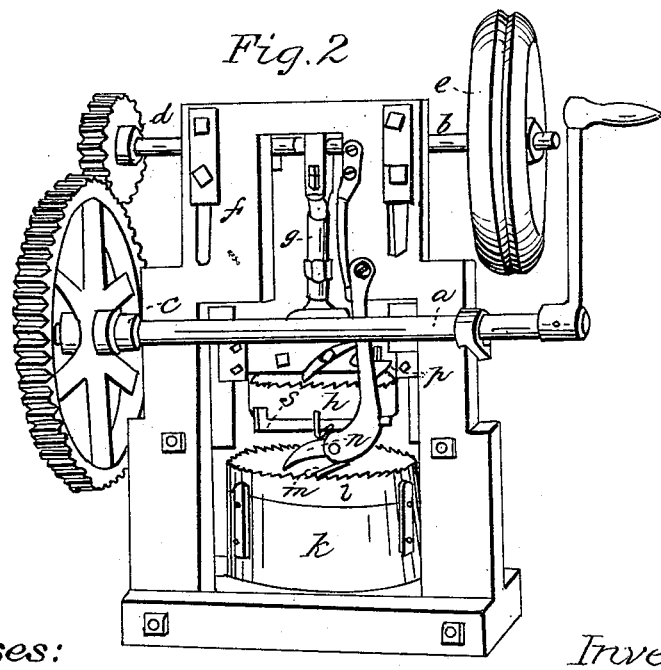
Figure 2, is a perspective view of the back, or rear view of the machine.

The driving-mechanism of my chopper is similar to that of other machines, and consists of the axles $a$ and $b$, with their reciprocating wheels $c$ and $d$, and the balance-wheel $e$, geared to or set upon an upright frame, $f$. To the upper or crank-axle $b$ I attach a hinged piston-rod $g$, which drives the intermittent rotary block $h$, which holds the knives $s\ s$ attached to a cross-head, $z$, which traverses the guiding-ways $i\ i$. Below this rotary knife-block is stationed the meat-block $k$, which is provided with a toothed rotating metallic rim, $l$, to which is fixed an inclined arm or wing, $m$, reaching from the circumference to the centre of the block for moving the meat. This rim is kept in place by means of the lugs $v\ v$. The intermittent rotary knife-block $h$, and the rotating metallic rim $l$, are moved by the pawls $n$ and $o$, the pawl $n$ being moved by the guide $p$, attached to the cross-head $z$, the pawl $o$, by the toothed rim of the knife-block $h$, in ascending.

When the machine is put in motion, the pawl $o$ operates upon the rotary knife-block $h$, moving it slightly or to the extent of a ratchet-tooth; and the pawl $n$, in the same way, drives the rotating rim, $l$, and is so arranged that the knives do not strike until after the rim $l$, with its arm or wing $m$, has moved the meat slightly, thus presenting a new or fresh surface to the blades or knives while they are rotating.

I do not claim the knife-blades or any portion of the machine in itself or separately; but

What I claim as my invention, and desire to secure by Letters Patent, is—

The combination of any convenient number of knives or blades with the intermittent rotary knife-block $h$, the block $k$, its toothed rotating metallic rim $l$, and arm or wing $m$, and the pawls $n$ and $o$, and guide, all arranged and operating substantially as described.

JOHN GEORGE HIRZEL.

Witnesses:
JAMES MOORE,
CHARLES A. WIGGINS.